United States Patent [19]

Hirade et al.

[11] 4,032,846

[45] June 28, 1977

[54] DIGITAL MOBILE COMMUNICATION SYSTEM AND METHOD

[75] Inventors: Kenkichi Hirade, Yokosuka; Takeshi Hattori, Yokohama; Hiromi Wasai, Kashiwa, all of Japan

[73] Assignee: Nippon Telegraph and Telephone Public Corporation, Tokyo, Japan

[22] Filed: Oct. 8, 1975

[21] Appl. No.: 620,622

[30] Foreign Application Priority Data

Oct. 9, 1974    Japan ............................ 49-116412

[52] U.S. Cl. .................................. 325/54; 325/67
[51] Int. Cl.² ........................................ H04H 3/00
[58] Field of Search ............... 325/51, 52, 53, 54, 325/56, 58, 156, 157, 158; 343/200, 207, 208

[56]          References Cited

UNITED STATES PATENTS

| | | |
|---|---|---|
| 2,904,674 | 9/1959 | Crawford ............................ 325/52 |
| 3,125,724 | 3/1964 | Foulkes et al. ...................... 343/207 |
| 3,662,267 | 5/1972 | Reed .................................... 325/51 |

*Primary Examiner*—Benedict V. Safourek
*Attorney, Agent, or Firm*—Sughrue, Rothwell, Mion, Zinn & Macpeak

[57]          ABSTRACT

A unique carrier frequency allocation in a digital mobile communication system having a service area consisting of a number of radio coverage zones is disclosed. A single standard carrier frequency is used in the service area but the carrier frequencies are arranged to be slightly shifted relative to each other for stations in adjacent radio coverage zones in order to improve the receiving efficiency in a region covered by overlapping zones. The invention defines a condition for the shift frequencies for the radio coverage zones.

4 Claims, 7 Drawing Figures

DIGITAL MOBILE COMMUNICATION SYSTEM AND METHOD

BACKGROUND OF THE INVENTION

1. Field of the Invention

The present invention relates to a method and system of carrier frequency allocation in a digital mobile communication system in order to realize an effective use of the carrier frequency and to improve the receiving reliability of the communication system. More particularly, the invention relates to a method of allocation of mutually shifted carrier frequencies for various radio coverage zones covering a certain service area.

2. Description of the Prior Art

When a selection call is to be made in a mobile communication system having a service area consisting of a plurality of radio coverage zones, it is necessary to transmit the same signal simultaneously from a plurality of transmitters to cover entire service area. In the conventional method of allocation of the radio frequency channels, either of the following two methods have been used. One is to allocate different frequency radio channels for each of the zones, and the other is to use the same frequency radio channel common to all of the zones.

In the former case, a large number of radio channels are required in order to avoid interference, as a result the efficiency in utilizing frequencies is lowered. Furthermore additional disadvantages are unavoidable, such as the requirement for multi-channel receivers in the mobile vehicles, and the increase of the lost call rate owing to a fact that several seconds of channel switching time is required. On the other hand in the second method a highly accurate carrier synchronizing system should be employed, and the calling reliability is lowered due to interference between the same frequency waves at the boundaries between radio coverage zones.

SUMMARY OF THE INVENTION

The present invention has for its object the mitigation of the aforementioned disadvantages in the allocation of frequency channels.

The present invention is an improved digital mobile communication system and method with improved reliability of the signal transmission resulting from using a standard carrier frequency for all of the radio coverage zones forming a service area and shifting the respective carrier frequency by a certain value for each of the zones. The invention further provides a general method of allocation of the shifting frequencies for any kind of zone construction.

BRIEF DESCRIPTION OF THE DRAWINGS

FIG. 2 and FIG. 3 show two results of experimental measurement using the experimental apparatus shown in FIG. 1, in which FIG. 2 shows a relation between error rate of reception and the receiving electric field strength, and FIG. 3 shows a relation between the error rate of reception and the shift frequency;

DESCRIPTION OF PREFERRED EMBODIMENT

The invention will now be described by referring to the accompanied drawings.

First of all, an experimental simulating apparatus shown in FIG. 1 for making analysis of the receiving radio waves will be explained.

Figure 1:
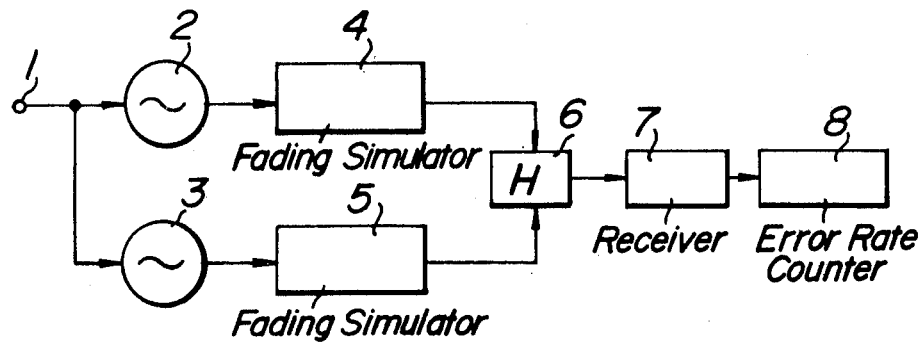
FIG. 1 shows a block diagram of an experimental apparatus for simulating the reception of two shifted frequencies and for analyzing the effect of the present invention.

In FIG. 1, a digital input signal supplied via the terminal 1 is fed to two carrier signal generators 2 aand 3, which generate carrier signals shifted by a certain frequency. The output carrier frequencies of the two mutually shifted carrier signal generators 2 and 3 are frequency modulated by the digital input signal and are fed to two fading simulators 4 and 5, respectively, for simulating a receiving electric field strength distribution received by a mobile object such as a car while running. The outputs of the fading simulators 4 and 5 are fed to a hybrid circuit 6 for combining the two output waves and the output therefrom is connected to a receiver 7 and then to an error rate counter 8.

In the operation of the simulating apparatus, the two carrier signal generators 2 and 3 are so arranged as to deliver output signals of the same output signal level and at frequencies shifted relative to one another by a certain value. The two mutually shifted carrier signals are frequency modulated by the identical digital signal input supplied through the input terminal 1. The two frequency modulated signals are fed to the two fading simulators 4 and 5, respectively, in order to simulate receiving condition of a multipath transmission medium for a mobile object. The receiving wave received by a mobile object such as a car via its single antenna is equivalent to a complex wave obtained by the hybrid circuit 6 so that the two waves are summed by the hybrid circuit 6 and received by the receiver 7. The assessment of the reception in the transmission system is obtained by measuring an error rate of reception of the digital signal so that the decoded signal is supplied to an error rate counter 8 and the error rate is obtained at the output thereof.

Figure 2:
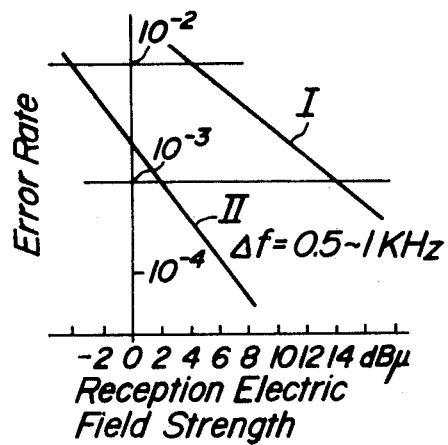
Figure 3:
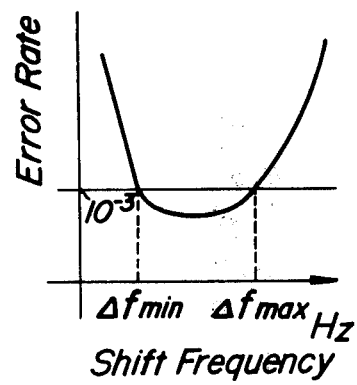

FIGS. 2 and 3 show a result of an experimental measurement using 800 MHz band carrier frequencies and an information transmission rate of 300 baud/sec.

FIG. 2 shows a relation between the error rate, plotted logarithmically along the ordinate, and the received electric field strength plotted along the abscissa. In FIG. 2, curve II represents measurement obtained by using the apparatus shown in FIG. 1 with a shift frequency $\Delta f$ of 500 Hz to 1 KHz. In the same figure, curve I represents the result of measurements obtained when there is only one wave, i.e. either of the carrier signal generator 2 or 3 is inactivated. As can be seen from FIG. 2, by using the two slightly shifted carrier waves, the error rate in reception is greatly improved, for instance by an order of $10^-$.

FIG. 3 shows a relation between the error rate and the shift frequency obtained by using the same apparatus shown in FIG. 1 and by changing the shift in frequency between the carrier signals of generators 2 and 3. As can be seen from FIG. 3, if an error rate less than $10^{-3}$ is desired, the shift frequency should be chosen between two certain values, i.e. between $\Delta f\!max$ and $\Delta f\!min$ (Hz). These values may be for instance between several hundreds to several thousands hertz.

As a result of the above experiment, it has been confirmed that the receiving characteristics in an overlapped zone may be improved by suitably selecting the shift frequency between the carriers which radiate into the overlapped zone. The shift, however, is so small and is kept inside a transmission band, that a multifrequency channel receiver is not required and no channel switching is necessary for interzone transfer.

Details in the allocation of the shifted carrier frequencies will be explained with respect to general radio coverage zone construction.

Figure 4:
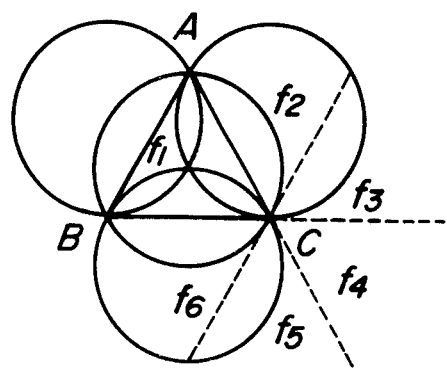
FIG. 4 shows a typical zone construction based on triangle cells.
Figure 6:
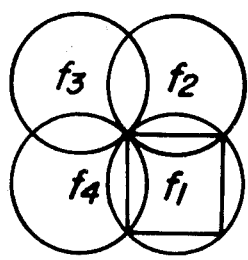
FIG. 6 shows a zone construction based on rectangle cells.
Figure 7:
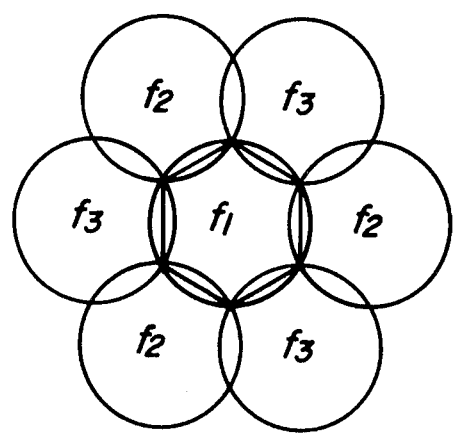
FIG. 7 shows a zone construction based on hexagonal cells.

There are three regular zone constructions; the triangle cell zone construction, the rectangle cell zone construction and the hexagonal cell zone construction. These regular zone constructions are depicted in FIGS. 4, 6 and 7, respectively. For irregular cell constructions, any one of the three regular cell constructions is used in parallel so that for the determination of a general rule, the three regular cell zone constructions will be considered.

1. Triangle cell zone construction

Triangle cell zone construction is shown in FIG. 4. Each circle in the figure represents a radio coverage zone. In this zone construction, as an extreme case, we must consider six adjacent zones. For instance, at the point C we must consider mutual relations of six zones covering this point. In FIG. 4, only three zones are depicted by circles for simpifying the drawing. But as indicated by $f_1, f_2, f_3, f_4, f_5, f_6$, six adjacent zones are to be considered and $f_1$ to $f_6$ represent respective carrier frequencies.

More generally, the radio carrier frequencies of any two of the adjacent zones are assumed as $f\!i$ and $f\!j$ at a certain given instance.

Further, we assume as follows.

$$|f\!i - f\!j| = \Delta f\!ij$$

The center frequency of each station covering an overlapping zone is assumed as $f\!io$ and $f\!jo$ with allowable fluctuating frequency $\Delta f\!si$ and $\Delta f\!sj$, respectively. Then the condition $|f\!i-f\!io| \leq \Delta f\!si$, $|f\!j-f\!jo| \leq \Delta f\!sj$ must be satisfied. In such a system, the value $\Delta f\!si$ or $\Delta f\!sj$ may be assumed to be the same in all of the stations so that it is assumed to be $\Delta f\!s$.

On the other hand, as has been confirmed by the aforementioned experiment there are maximum and minimum values $\Delta f\!max$ and $\Delta f\!min$ of the shift frequency for obtaining an error rate less than a certain value as illustrated in FIG. 3.

Figure 5:
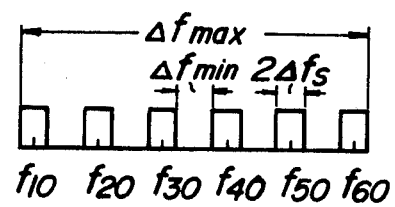
FIG. 5 is a basic diagram for showing a relation between an allowable frequency fluctuation and the maximum and minimum values of the shift frequency in a frequency allocation of the present invention.

Accordingly the six center frequencies $f_{10}, f_{20}, f_{30}, f_{40}, f_{50}$ and $f_{60}$ may be arranged as shown in FIG. 5. This means that the six frequencies $f_{10}$ to $f_{60}$ added with or deducted by the allowable fluctuation frequency $\Delta f\!s$ must be arranged in the range of $\Delta f\!max$ and must be separated at least by $\Delta f\!min$ between each other.

From the relation shown in FIG. 5, it may be derived that the carrier frequencies $f\!i, f\!j$ for any adjacent radio coverage zones must be selected to satisfy the following relations.

$$\Delta f\!min \leq \Delta f\!ij \leq \Delta f\!max$$

and $$0 \leq \Delta f\!s \leq (\Delta f\!max - 5\Delta f\!min)/12$$

From the above equations and the practical value of $\Delta f\!s$, the shifted center frequencies for each of the six stations covering the one adjacent zone group may be decided. If the standard center frequency for the first station is given by $f_{10}$, then the center frequencies of second to sixth stations are given by the following.

$$\begin{aligned}
f_{20} &= f_{10} + 2\Delta f\!s + \Delta f\!min \\
f_{30} &= f_{10} + 4\Delta f\!s + 2\Delta f\!min \\
f_{40} &= f_{10} + 6\Delta f\!s + 3\Delta f\!min \\
f_{50} &= f_{10} + 8\Delta f\!s + 4\Delta f\!min \\
f_{60} &= f_{10} + 10\Delta f\!s + 5\Delta f\!min
\end{aligned}$$

This relation of carrier frequencies for one adjacent zone group may be extended in a same manner to cover the entire service area. Namely the whole area may be covered by a single standard frequency but each adjacent zone group has six slightly shifted carrier frequencies satisfying the aforementioned relationship.

2. Rectangle cell zone construction

A basic rectangle cell zone construction is shown in FIG. 6. In this case the same principle as has been explained by referring to FIGS. 4 and 5 may be applied and the entire service area may be covered by four kinds of shifted carrier frequencies $f_1$ to $f_4$.

The allowable varying frequency may be obtained by the following relation.

$$0 \leq \Delta f\!s \leq (\Delta f\!max - 3\Delta f\!min)/8$$

The four center frequencies $f_{10}$ to $f_{40}$ must have following relationship.

$$\begin{aligned}
f_{20} &= f_{10} + 2\Delta f\!s + \Delta f\!min \\
f_{30} &= f_{10} + 4\Delta f\!s + 2\Delta f\!min \\
f_{40} &= f_{10} + 6\Delta f\!s + 3\Delta f\!min
\end{aligned}$$

3. Hexagonal cell zone construction

In this case,, as can be understood from the diagram shown in FIG. 7 the whole service area may be covered by three kinds of shifted carrier frequencies $f_1, f_2$ and $f_3$.

The restrictive condition is as same principle as of the above cases and is given by the following.

$$0 \leq \Delta f\!s \leq (\Delta f_{max} - 2\Delta f\!min)/6$$

The three shifted carrier frequencies must satisfy the following relationship.

$$\begin{aligned}
f_{20} &= f_{10} + 2\Delta f\!s + \Delta f\!min \\
f_{30} &= f_{10} + 4\Delta f\!s + 2\Delta f\!min
\end{aligned}$$

One practical embodiment of the digital mobile communication system is as follows.

A standard carrier frequency of 800 MHz is used in 600 baud/sec signal transmission speed and the frequency deviation of the FM wave by the digital signal is 5 KHz. By selecting $\Delta f\!min$ as 400 Hz and $\Delta f\!max$ as 3,000 Hz (3 KHz), the value of maximum allowable frequency fluctuation of the carrier wave $\Delta f\!s$ will be as follows.

a. triangle cell zone construction — 83 Hz
b. rectangle cell zone construction — 225 Hz
c. hexagonal cell zone construction — 360 Hz This means relative stability of the center frequency of the carrier wave will be $1\times10^{-7}$, $2.8\times10^{-7}$ and $4.5\times10^{-7}$, respectively, for the cases of a, b and c.

For covering an entire radio service area, it is possible to use a combination of more than two constructions of the above explained triangle cell zone construction, rectangle cell zone constructon and the hexagonal zone construction.

As has been explained in the foregoing, in accordance with the present invention, by assigning slightly shifted carrier frequencies under a certain condition for a single standard carrier frequency, a digital mobile communication system is realized using one carrier frequency channel which may afford a high efficiency in utilizing the carrier frequency channels and the receivers may be of one channel. As a result, the cost of the whole communication system can be reduced and the maintenance may be simplified. Furthermore, higher receiving reliability can be obtained than in a system without using the principle of the shift frequencies. Further, when the present invention is applied to a control signal for obtaining access to a mobile subscriber station, the need for channel switching at the time of area transition is obviated, with the result that the lost call probability is reduced.

The invention has been described by a general example only, but it can be applied to various practical uses by deciding upon the requirements for the system.

What is claimed is:

1. In a digital mobile communications system of the type wherein the same transmission signal is simultaneously transmitted in each of a plurality of transmission zones on a common standard carrier whose frequency is located within a single radio channel bandwidth for all of the transmission zones in the system, and wherein adjacent transmission zones overlap, the improved method of transmission comprising choosing first and second nominal center carrier frequencies for two adjacent transmission zones, respectively, which overlap, such that the difference between said first and second carrier frequencies is a value between $\Delta f\text{min}$ and $\Delta f\text{max}$, such value being very small compared to the standard carrier frequency, and being selected to achieve a predetermined minimum error rate of reception in the overlapped zone, and wherein the following relationships are satisfied:

$$|fi - fio| \leq \Delta fsi;$$
$$|fj - fjo| \leq \Delta fsj;$$

and $$\Delta f\text{min} \leq \Delta fij \leq \Delta f\text{max};$$

where $\Delta fij$ is the frequency shift between said first and second frequencies having respective nominal center frequencies $fio$ and $fjo$, instantaneous center frequencies $fi$ and $fj$, and allowable frequency fluctuations $\Delta fsi$ and $\Delta fsj$.

2. The method of claim 1, wherein the transmission zones are formed of triangle cell zone construction and in which six adjacent unit zones are covered by transmissions with the center frequencies of $f_{10}$ to $f_{60}$ having the following relationship:

$$f_{20} = f_{10} + 2\Delta fs + \Delta f\text{min}$$
$$f_{30} = f_{10} + 4\Delta fs + 2\Delta f\text{min}$$
$$f_{40} = f_{10} + 6\Delta fs + 3\Delta f\text{min}$$
$$f_{50} = f_{10} + 8\Delta fs + 4\Delta f\text{min}$$
$$f_{60} = f_{10} + 10\Delta fs + 5\Delta f\text{min}$$

and $$0 \leq \Delta fs \leq (\Delta f\text{max} - 5\Delta f\text{min})/12$$

wherein $\Delta fs$ is the maximum allowable frequency fluctuation of each center frequency.

3. The method of claim 1, wherein the transmission zones are formed of rectangle cell zone construction and in which four adjacent unit zones are covered by transmission with center frequencies of $f_{10}$ to $f_{60}$ having the following relationship:

$$f_{20} = f_{10} + 2\Delta fs + \Delta f\text{min}$$
$$f_{30} = f_{10} + 4\Delta fs + 2\Delta f\text{min}$$
$$f_{40} = f_{10} + 6\Delta fs + 3\Delta f\text{min}$$

and $$0 \leq \Delta fs \leq (\Delta f\text{max} - 3\Delta f\text{min})/8$$

wherein $\Delta fs$ is the maximum allowable frequency fluctuation of each center frequency.

4. The method of claim 1, wherein the transmission zones are formed of hexagonal zone construction and in which three adjacent unit zones are covered by transmission with the center frequencies $f_{10}$ to $f_{30}$ having the following relationship:

$$f_{20} = f_{10} + 2\Delta fs + \Delta f\text{min}$$
$$f_{30} = f_{10} + 4\Delta fs + 2\Delta f\text{min}$$

and $$0 \leq \Delta fs \leq (\Delta f\text{max} - 2\Delta f\text{min})/6$$

wherein $\Delta fs$ is the maximum allowable frequency fluctuation of each center frequency.

* * * * *